US012555239B2

(12) United States Patent
Amthor et al.

(10) Patent No.: US 12,555,239 B2
(45) Date of Patent: Feb. 17, 2026

(54) MICROSCOPY SYSTEM AND METHOD FOR IMAGE SEGMENTATION (71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 580 days.

(21) Appl. No.: 17/493,937

(22) Filed: Oct. 5, 2021

(65) Prior Publication Data
US 2022/0114732 A1 Apr. 14, 2022

(30) Foreign Application Priority Data
Oct. 9, 2020 (DE) .................... 10 2020 126 602.2

(51) Int. Cl.
*G06T 7/11* (2017.01)
*G02B 21/36* (2006.01)

(52) U.S. Cl.
CPC .............. *G06T 7/11* (2017.01); *G02B 21/367* (2013.01); *G06T 2207/10056* (2013.01); *G06T 2207/20081* (2013.01)

(58) Field of Classification Search
CPC ............. G06T 7/11; G06T 2207/10056; G06T 2207/20081; G02B 21/367
See application file for complete search history.

(56) References Cited

U.S. PATENT DOCUMENTS

| 5,294,989 A * | 3/1994 | Moore ................ H04N 5/21 348/241 |
| 5,828,776 A * | 10/1998 | Lee .................. G06V 20/69 382/128 |
| 5,978,497 A * | 11/1999 | Lee .................. G06V 20/69 382/173 |
| 10,885,631 B2 * | 1/2021 | Jackson ............ G01N 21/6486 |
| 11,301,748 B2 | 4/2022 | Sha et al. |
| 11,307,398 B2 * | 4/2022 | Haase ................. G02B 21/125 |

(Continued)

FOREIGN PATENT DOCUMENTS

| CN | 108875732 A | * 11/2018 | ........... G06K 9/3233 |
| DE | 102017109698 A1 | 11/2018 | |

(Continued)

OTHER PUBLICATIONS

Ginzberg MB, Kafri R, Kirschner M. Cell biology. On being the right (cell) size. Science. May 15, 2015;348(6236):1245075. doi: 10.1126/science.1245075. PMID: 25977557; PMCID: PMC4533982. (Year: 2015).*

(Continued)

*Primary Examiner* — Stephen R Koziol
*Assistant Examiner* — Ashley Hytrek
(74) *Attorney, Agent, or Firm* — LaBatt, LLC (57) ABSTRACT A microscopy system comprises a microscope configured to capture an overview image and a computing device comprising a model trained for image segmentation, which calculates a segmentation mask based on the overview image. The computing device adjusts a pattern described by a parameterized model to the segmentation mask. An updated segmentation mask is generated using the adjusted pattern.

20 Claims, 4 Drawing Sheets

(56) References Cited

U.S. PATENT DOCUMENTS

| | | | |
|---|---|---|---|
| 11,379,970 B2* | 7/2022 | Koopman | G06F 18/214 |
| 11,620,507 B2 | 4/2023 | Otterstedt | |
| 11,754,392 B2* | 9/2023 | Amthor | G02B 21/26 356/27 |
| 11,861,497 B2 | 1/2024 | Levinshtein et al. | |
| 2008/0044084 A1* | 2/2008 | Lee | G06T 7/00 382/190 |
| 2009/0196487 A1* | 8/2009 | Yishai | G06T 7/0004 382/145 |
| 2020/0057291 A1 | 2/2020 | Haase et al. | |
| 2020/0088984 A1* | 3/2020 | Haase | G02B 21/125 |
| 2020/0200531 A1 | 6/2020 | Amthor et al. | |
| 2020/0371333 A1 | 11/2020 | Amthor et al. | |
| 2020/0380362 A1 | 12/2020 | Cao et al. | |
| 2021/0064845 A1* | 3/2021 | Stumpe | G06V 20/695 |
| 2021/0080838 A1* | 3/2021 | Tel | G03F 7/70616 |
| 2021/0264589 A1 | 8/2021 | Jacob et al. | |
| 2021/0374936 A1* | 12/2021 | Koopman | G06F 18/24133 |
| 2022/0114387 A1* | 4/2022 | Amthor | G06V 10/993 |
| 2022/0114732 A1 | 4/2022 | Amthor et al. | |
| 2022/0392062 A1 | 12/2022 | Badiola | |
| 2023/0221239 A1 | 7/2023 | Praljak et al. | |
| 2023/0259587 A1 | 8/2023 | Lin et al. | |
| 2023/0281809 A1 | 9/2023 | Song et al. | |

FOREIGN PATENT DOCUMENTS

| | | |
|---|---|---|
| DE | 102017111718 A1 | 12/2018 |
| DE | 102018133188 A1 | 6/2020 |
| DE | 102019114012 A1 | 11/2020 |
| WO | 2019160580 A1 | 8/2019 |

OTHER PUBLICATIONS

He, K., Gkioxari, G., Dollar, P., & Girshick, R. (Oct. 2017). Mask R-CNN. Proceedings of the IEEE International Conference on Computer Vision (ICCV) (Year: 2017).*

G. Srinivasa, M. C. Fickus, Y. Guo, A. D. Linstedt and J. Kovacevic, "Active Mask Segmentation of Fluorescence Microscope Images," in IEEE Transactions on Image Processing, vol. 18, No. 8, pp. 1817-1829, Aug. 2009, doi: 10.1109/TIP.2009.2021081. (Year: 2009).*

"Lymphe," Wikipedia, last edited on Sep. 28, 2020, accessed on May 5, 2021, https://de.wikipedia.org/w/index.php?title=Lymphe&oldid=204061667, 10 pages, (English translation provided).

Dr. Nabers, DE Application No. 102020126610.3, Search Report, May 17, 2021, 9 pages (No English translation available).

Dr. Nabers, DE Application 102020126602.2, Search Report, May 17, 2021, 9 pages (No English translation available).

He, K., et al., "Mask R-CNN", arXiv:1703.06870v3 [cs.CV] https://arxiv.org/pdf/1703.06870, 12 pages.

Office action for U.S. Appl. No. 17/493,915, filed Sep. 29, 2024, 14 pages.

Final office action for U.S. Appl. No. 17/493,915, filed Apr. 16, 2025, 19 pages.

Office action for corresponding Chinese Patent Application No. 202111129861.6, Jul. 30, 2025, 17 pages (with English Translation).

Notice of allowance for U.S. Appl. No. 17/493,915, filed Aug. 11, 2025, 7 pages.

* cited by examiner

MICROSCOPY SYSTEM AND METHOD FOR IMAGE SEGMENTATION

REFERENCE TO RELATED APPLICATIONS

The current application claims the benefit of German Patent Application No. 10 2020 126 602.2, filed on 9 Oct. 2020, which is hereby incorporated by reference. Aspects of the current application are related to German Patent Application No. 10 2020 126 610.3, filed on 9 Oct. 2020 and the corresponding U.S. patent application Ser. No. 17/493,915, filed on Oct. 2021, each of which is hereby incorporated by reference.

FIELD OF THE DISCLOSURE

The present disclosure relates to a microscopy system and a method for image segmentation.

BACKGROUND OF THE DISCLOSURE

Automation and user comfort are playing an increasingly important role in modern microscopy systems and other measuring devices. A microscopy system is expected, for example, to detect, navigate and analyze a sample in a largely automated manner. To this end, a user is presented with an overview or navigation map, which may be constituted by a plurality of partial images (image stitching) and in which the user can select a location based on which a motorized sample stage can then be positioned and an analysis performed with a higher magnification automatically. An automatic sample detection can also be used for collision prevention through the definition of allowed areas of movement for motorized microscope components based on the detected sample or detected sample carrier. For these applications, typically at least one overview image is captured with an overview camera wherefrom a segmentation mask is calculated for further analysis, as described later on in greater detail.

A generic microscopy system comprises a microscope configured to capture an overview image and a computing device. The latter comprises a model trained for image segmentation, which is configured to calculate a segmentation mask based on the overview image.

Analogously, in a generic method for image segmentation, an overview image is received and a segmentation mask is calculated based on the overview image by means of a model trained for image segmentation.

Figure 1:
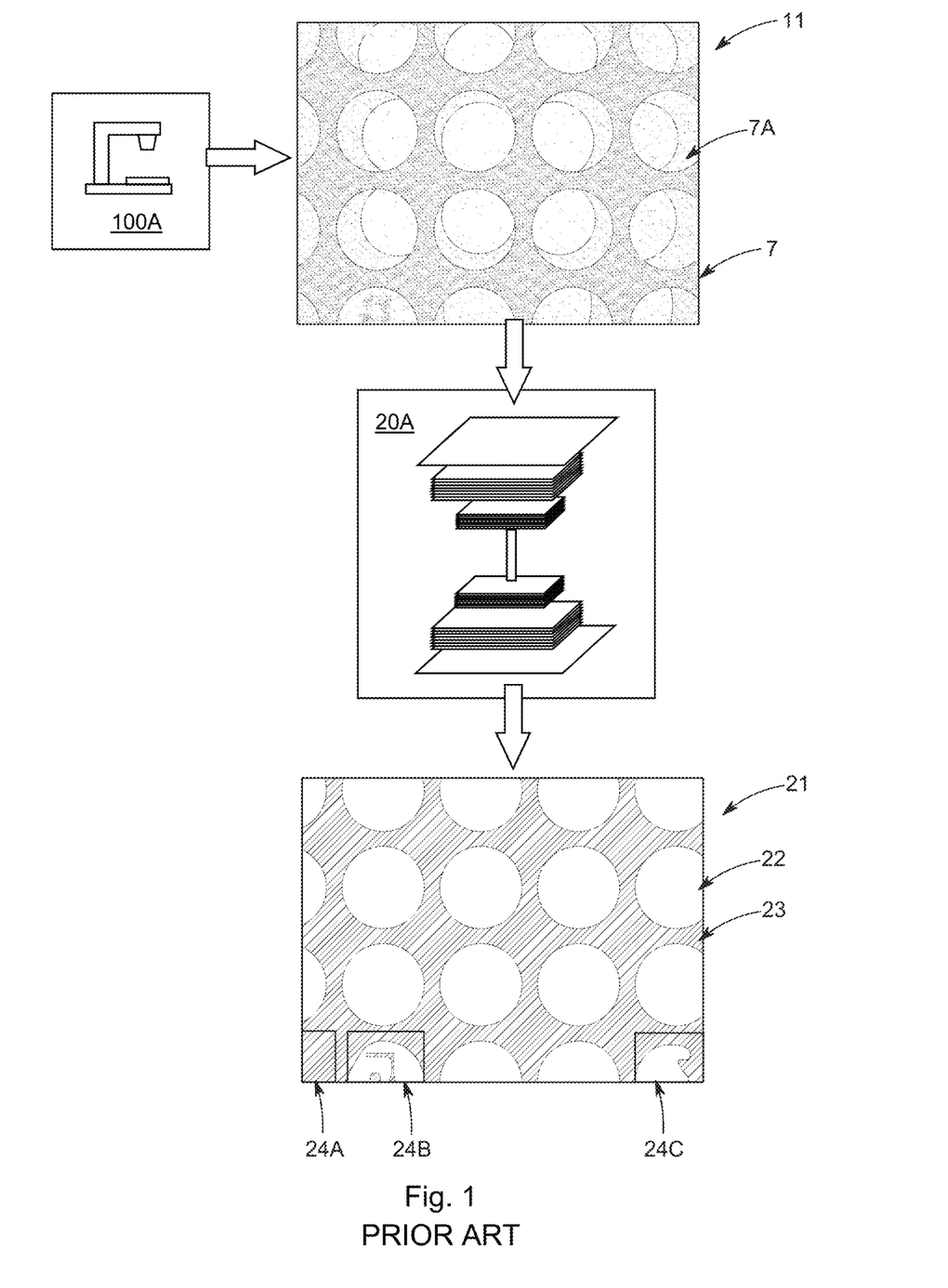
FIG. 1 is a schematic illustration of a capturing and segmentation of an overview image according to the prior art.

For the purposes of illustration, the above process steps, which are executed by a microscopy system as described above, are illustrated with reference to FIG. 1. A known microscopy system 100A generates an overview image 11, for example via an overview camera provided in addition to the microscope camera with which a sample can be examined. In the illustrated example, the overview image 11 shows a section of a sample carrier 7 with a plurality of sample receptacles 7A. The sample carrier 7 can be a microtiter plate with a plurality of wells as sample receptacles 7A. The overview image 11 is then fed to a model 20A of a computing device of the microscopy system 100A trained for image segmentation. The trained model 20A was learned by means of a learning algorithm using predefined training data and can be, e.g., a convolutional neural network (CNN). The trained model 20A calculates a segmentation mask 21 from the overview image 11. This can be a binary mask with two different pixel values of which one pixel value labels sample receptacles 22 and the other pixel value labels sample carrier areas 23 outside sample receptacles 22. The calculation of such a segmentation mask 21 is described, for example, by the Applicant in DE 10 2017 111 718 A1, see in particular paragraph [0046]. A sample navigation in which a positioning based on a particular sample receptacle 22 among a plurality of sample receptacles 22 occurs automatically is readily implementable using the segmentation mask 21. It is also possible to present a user with a representation or navigation map in which the sample receptacles 22 of the segmentation mask 21 are highlighted so that it is easier for the user to select a sample receptacle 22 for positioning.

The segmentation mask 21 should ideally be error-free for the aforementioned functions. However, as illustrated schematically in FIG. 1 in the areas 24A, 24B and 24C, this is not always the case. For example, unfavorable illumination conditions, dirt on the sample carrier or even dyes of the samples accommodated in the sample receptacles can occasion erroneous image processing. If the sample carrier 7 is partially transparent, the calculation of a correct segmentation mask is rendered more complicated still.

In order to detect erroneous segmentation masks, the Applicant developed a verification model described in DE 10 2019 114 012.9. A model capable of judging whether a provided segmentation mask is likely to be correct or likely to be erroneous is learned by means of a learning algorithm based on training data.

There thus exists a continuing effort to derive and provide ideally accurate and error-free segmentation masks from overview images of microscopes or other imaging devices.

SUMMARY OF THE DISCLOSURE

It can be considered an object of the invention to provide a microscopy system and a method capable of calculating an ideally error-free segmentation mask based on at least one overview image.

This object is achieved by means of the microscopy system with the features of claim 1 and by means of the method with the features of claim 2.

According to the invention, in the microscopy system of the aforementioned type, the computing device is configured to adjust a pattern described by a parameterized model to the segmentation mask. Using the adjusted pattern, the computing device then generates an updated segmentation mask.

According to the invention, also in the method of the aforementioned type, a pattern described by a parameterized model is adjusted to the segmentation mask. An updated segmentation mask is created using the adjusted pattern.

Knowledge of geometric properties of image content of the overview image can be exploited by the parameterized model for describing a pattern. This pattern can predefine particular shapes or geometric content which can be adjusted by variable parameters. For example, the pattern can comprise circular shapes in a regular arrangement, wherein the size and spacing of the latter are adjustable by means of the parameters. Such a pattern can represent with precision a segmentation mask of an overview image of a microtiter plate comprising circular sample receptacles/wells in a regular arrangement.

Optional Designs

Advantageous variants of the microscopy system according to the invention and of the method according to the invention are the object of the dependent claims and are explained in the following.

Parameterized Model for Describing the Pattern

The parameterized model specifies a framework model the appearance (visual representation) of which is defined by means of values of parameters that are to be determined. The cited pattern constitutes this appearance in the present disclosure.

The pattern can in particular be a regular pattern and/or comprise repeating shapes. A shape or an object can in particular be a delineated (closed) shape, for example a circle, an oval, a rectangle, a square or a distorted/elongated representation of these objects. The pattern can thus exhibit periodicity.

In particular, the regular pattern can comprise or be an arrangement of shapes in the form of a grid. The shapes can be similar shapes or similarly shaped objects (e.g. circles) and can thus correspond to the sample receptacles of a sample carrier. A grid arrangement is to be understood as denoting a uniform spacing between objects in one direction or in two directions in the two-dimensional pattern. Not all objects of the pattern have to have the same shape in the grid arrangement, however. For example, a grid arrangement can be used to describe a microarray or microarray slide. In a microarray slide, samples, for example tissue samples, can be arranged with a predefined spacing in the form of a grid, e.g., by means of paraffin embedding. The individual tissue samples do not have to have the same shape or can appear to have different shapes due to, e.g., an uneven staining.

The regular pattern can in particular describe a sample carrier. The shapes of the pattern in this case correspond to the sample areas of the sample carrier or, if applicable, to sample receptacles of the sample carrier. The sample carrier can be, for example, a microtiter plate with (circular) wells or a chamber slide with (rectangular or square) chambers as sample receptacles. The sample carrier can also comprise a Petri dish with a compartmentalization, for example a star-shaped division into two, three or more chambers. The sample carrier can also be a transparent slide on which a plurality of samples are arranged spaced apart from one another. The pattern can also be used to describe a matrix arrangement of samples, e.g., material samples. The term "sample" is intended to be understood here in a general sense and can in particular comprise biological samples, rock samples, semiconductor products or electronic components.

The parameters of the parameterized model by means of which the pattern is defined are calculated so that the pattern has a highest possible degree of correspondence with the segmentation mask. Correspondence can be understood in terms of overlapping surface areas when the pattern is superimposed on the segmentation mask. That is to say that an imaged representation of the pattern can be generated with the same number of pixels (image resolution) as the segmentation mask and this representation of the pattern is superimposed on or compared with the segmentation mask. The Jaccard similarity coefficient—also known as the Jaccard index and expressed as the ratio of Intersection over Union—can be calculated as the quality measure for the correspondence.

Parameters of the Parameterized Model

The parameters of the parameterized model can in particular indicate one or more of the following characteristics:

Sizes of shapes of the pattern. In particular, a parameter can indicate a uniform size of a plurality of or all shapes, which is practical, e.g., for describing sample receptacles of a microtiter plate or a chamber slide. A plurality of parameters can generally describe the sizes of the shapes, wherein the number of parameters employed for describing size is smaller than the number of shapes.

Spacing between shapes of the pattern. A parameter can in particular describe a uniform spacing between a plurality or all shapes of the pattern, as is generally fitting for microtiter plates or chamber slides. It is also possible to use separate parameters for each spatial direction (e.g., in the horizontal and vertical directions) to indicate a uniform spacing, whereby a spacing between rows of shapes can differ from a spacing between columns of shapes.

Slope of the pattern. A parameter can describe a slope of the pattern relative to a straight reference line, i.e. an angle of rotation of the pattern. The slope can indicate, e.g., an orientation of rows or columns of shapes of the pattern relative to an image boundary of the segmentation mask.

Position of the pattern relative to the segmentation mask. The position of the pattern can be described by one translation parameter or two translation parameters for two directions.

Start and end positions of the pattern. Depending on the field of view of an overview image or the scene being viewed, it is possible that the content of the overview image or segmentation mask is not constituted entirely by objects to be described by the pattern. For example, an overview image can show a chamber slide in its entirety so that the sample receptacles do not extend over the entire overview image nor—as a result—over the entire segmentation mask in the horizontal and vertical directions. In such cases, it can be expedient for additional parameters to describe start and end positions of the pattern or a total number of shapes. For example, a parameter can indicate the number of shapes per row and another parameter can indicate the number of shapes per column. Alternatively, this issue can be avoided by first cropping the segmentation mask so that the depicted objects extend over the entire width or height of the image.

Class type of the shapes of the pattern. Class types should be understood as different geometric shapes, e.g., a circle as opposed to a rectangle or square. A parameter for indicating the class type thus does not assume a value on a number continuum, in contrast to, e.g., the parameter for indicating spacing. By adjusting the parameter pertaining to class type, it is in particular possible to describe and correct segmentation masks of sample carriers with circular sample receptacles as well as segmentation masks of sample carriers with square sample receptacles without knowing the shape of the sample receptacles in advance. For example, a readily implementable calculation method can provide that an iterative adjustment of the parameterized model is calculated for each allowed parameter value pertaining to the class type, wherein the parameter value pertaining to the class type initially remains unaffected by the respective iterative adjustments. It can subsequently be evaluated for which class type the best adjustment was achieved, i.e. the greatest correspondence with the segmentation mask.

The parametric model can in particular exploit the fact that a plurality of shapes have identical properties and/or are in a regular arrangement. Defective areas in the segmentation mask—e.g., missing objects or a shape deviating from the shape of the other objects—can not only be detected thereby, but above all corrected.

Iterative Adjustment or Analytical Calculation of the Parameters

Adjusting the pattern to the segmentation mask can be understood as an iterative adjustment of the parameters by means of which the pattern is described or as an analytical calculation of said parameters (without iterative modifications of the parameters).

If the parameters are calculated by means of an iterative adjustment, the predefined iteration target can be to maximize the correspondence between the pattern and the segmentation mask. For example, the Jaccard similarity coefficient can be maximized. Alternatively, a deviation between the pattern and the segmentation mask can be minimized over the iteration steps.

An analytical calculation of the parameters without iterative adjustments can occur, e.g., by calculating an average spacing between adjacent objects of the segmentation mask and using this average as a standard spacing of the shapes of the pattern. The slope of rows can also be calculated analytically, e.g., by calculating a center point for each object in the same row of the segmentation mask and then calculating a regression line through these center points; the slope is then the angle between the regression line and a predefined reference line, for example an edge of the overview image/segmentation mask.

Image Classification for Limiting Pattern, Exploitation of Contextual Data

It is possible to calculate an image classification of the overview image or an image created therewith, e.g., the segmentation mask. This can occur in particular with a classification model that was learned by a learning algorithm using training data. Different patterns, which are described by respective parameterized models, can be stored for different image classes. For example, a pattern can be used to describe a cover slip on a slide. This pattern defines a rectangle or square, wherein the orientation and size of the rectangle require adjustment via parameter values. Another pattern can describe objects with an identical shape arranged in a matrix and be used for an image class indicating a microtiter plate or a chamber slide. Depending on a result of the image classification, an associated stored pattern is selected and used for the adjustment to the segmentation mask. Microtiter plates and chamber slides can also be classified as different image classes so that either a pattern with round shapes or a pattern with rectangular shapes can be selected.

Alternatively or additionally, the overview image or an image calculated therewith, e.g. the segmentation mask, can be assessed in order to detect a sample carrier type. Different sample carrier types can be, e.g., microtiter plates, Petri dishes with a compartmentalization, chamber slides or slides with cover slips. Optionally, the sample carrier type can also distinguish between different sample carrier models of the same category, i.e., e.g., between different makes/model numbers of a plurality of possible microtiter plates which differ with respect to the number, size and/or spacing of the sample receptacles. Contextual data is stored for different sample carrier types, wherein the contextual data that pertains to the detected sample carrier type is used to adjust the pattern. The contextual data can indicate values of the parameters, e.g., of a parameter that distinguishes between circular, square or rectangular sample receptacles. The contextual data can also relate to parameter starting values and/or parameter limit/border values for an iterative adjustment of the parameters.

Use of the Adjusted Pattern

The adjusted pattern can be used directly as an updated segmentation mask and output, for example, to a user or to a subsequent image processing program. For example, the adjusted pattern can be used as or for a navigation map by means of which a user can select a location based on which a motorized sample table is then positioned.

A segmentation mask determined from an overview image usually specifies a pixel-by-pixel classification so that an image resolution of the segmentation mask is limited according to the pixels it contains. In contrast, the adjusted pattern used as the updated segmentation mask can take the form of vector graphics. Vector graphics are described by geometric shapes not necessarily subject to a limited image resolution. Such vectorization also often facilitates subsequent processing and calculation steps.

The adjusted pattern does not necessarily have to be used as the new segmentation mask. Instead, it can also be used to modify the previous segmentation mask calculated from the overview image. For example, by comparing the adjusted pattern with the segmentation mask, problem areas in the segmentation mask can be identified and corrected using the adjusted pattern. In particular, the problem areas of the previous segmentation mask can be replaced by corresponding areas of the adjusted pattern while the remaining image areas of the previous segmentation mask remain unmodified. The thus corrected segmentation mask can then be used as the updated segmentation mask.

Alternatively or additionally, the adjusted pattern can be used to verify the previous segmentation mask: To this end, the Jaccard similarity coefficient or another measure of a degree of correspondence between the adjusted pattern and the segmentation mask is considered. If the type of image content depicted in the overview image (e.g. a chamber slide) is known or has been determined with a high degree of reliability, a good pattern adjustment (e.g. an arrangement of squares in the form of a grid) should be possible and the Jaccard similarity coefficient accordingly relatively high. Any minor deviations should be due to defective areas of the segmentation, which are corrected in the variants described thus far. Should deviations exceed a threshold value, e.g. if the Jaccard similarity coefficient falls below a predefined minimum value, an error can be inferred. For instance, calibration data, which is described in the following, may be inaccurate. An error signal is then output, for example to a user or to another analysis program, for example a program for checking a calibration.

Exploiting Calibration Data

Calibration data is used frequently and indicates a relationship between positions in the overview image and spatial coordinates in relation to the measuring device/microscope. It is in particular possible to take into account the angle at which a sample stage or a sample carrier is viewed by means of the calibration data. The calibration data thus enables a mapping of a captured overview image onto another plane. It is thus possible to calculate a homography in which an overview image in which a sample carrier is viewed from an oblique direction is converted into a plan-view image. The plan-view image corresponds to a view of the sample carrier from a direction perpendicular to its top side. In some variant embodiments, a plan-view image is first calculated from the overview image using calibration data and the segmentation mask is subsequently calculated from the plan-view image. This often enables an easier and better calculation of a segmentation. For example, if plan-view images are used in a standardized manner, a smaller range of training data can suffice for a segmentation model generated by machine learning. In the case of a microtiter plate with circular wells, the shape of the wells in a segmentation mask of a plan-view image should be exactly circular, whereby the use of additional parameters for describing an oblique view becomes unnecessary.

Alternatively, the segmentation mask can be calculated from the overview image without first calculating a plan-view image with calibration data. In this case, the segmentation mask generally corresponds to an oblique view. This oblique view needs to be taken into account for the pattern to be adjusted. For example, the model has to represent ovals in order to replicate circular wells in an oblique view. Additional parameters can be used to this end, for example two parameters for defining ovals instead of one parameter for a circle. The perspective of an even spacing between sample receptacles changes in an oblique view so that a distance in the horizontal direction x can be described by two parameters a and b, for example in the form a+bx, and a distance in the vertical direction y accordingly by two further parameters. Instead of increasing the number of parameters in this manner, it is also possible to use the calibration data in the calculation of the pattern. The pattern described by the parameterized model can thus be adapted to viewing characteristics of the overview image (e.g. viewing angle and position relative to the camera) using the calibration data before the pattern is adjusted to the segmentation mask. The parameters of the model can thus describe, e.g., circles of a uniform size and with a uniform spacing, as described in the foregoing. By means of the calibration data, this pattern is mapped homographically onto another plane corresponding to the segmentation mask. The pattern is thus treated as a plan view, which is transposed homographically into the appropriate oblique view.

General Features

A microscopy system is understood to be an apparatus that comprises at least one computing device and a microscope. In principle, a microscope can be understood to be any measurement device with magnification capabilities, in particular a light microscope, an X-ray microscope, an electron microscope, a macroscope or an image-capturing device with magnification capabilities of some other design.

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphics processors. The computing device can additionally be configured to control the microscope camera, image capture, the sample stage drive and/or other microscope components.

The overview image can be acquired with an overview camera, which can be provided in addition to a sample camera capable of capturing images of a sample area with a higher magnification. Alternatively, one and the same camera can be used, wherein different objectives or optical systems are used for the capture of an overview image and a more magnified sample image. A raw image from a camera can be used directly as the overview image or, alternatively, the overview image can be calculated from one or more raw images. For example, a plurality of raw images staggered laterally can be stitched together to form the overview image. A homography can be calculated from one or more raw images as described in the foregoing before the overview image is obtained therefrom. A plurality of raw images can also be superimposed to form an overview image.

A segmentation mask can be understood in the present disclosure as an image in which it is respectively specified for different image areas to which object they belong. The segmentation mask thus labels boundaries of displayed objects. If the segmentation mask is calculated by a machine learning model, i.e. by a model for segmentation learned using training data, the machine learning model defines what kind of objects are labelled in the segmentation mask. For example, sample receptacles of a sample carrier can be labelled as objects. A labelling of the object or object type to which an image area belongs can occur by means of pixel values. The segmentation mask can thus be a binary mask, wherein two different pixel values are used to label whether a pixel belongs to one or the other of two possible objects (e.g. sample receptacle or no sample receptacle). A segmentation mask can also use more than two different pixel values in order to distinguish between a plurality of objects. The calculation of such a segmentation mask can occur, for example, by means of a plurality of machine learning models trained to segment different objects, which respectively calculate a binary mask and subsequently superimpose the plurality of binary masks in order to form a segmentation mask with more than two pixel values. Segmentation masks often consist of pixels, i.e. a 2D matrix of image elements, although it is alternatively also possible to use vector graphics as segmentation masks. In principle, models for segmentation, for semantic segmentation or for instance segmentation comprising in principle any network architecture can be employed as the model for image segmentation.

The model trained for image segmentation can be, for example, a CNN (convolutional neural network) or an FCN (fully convolutional network). A learning algorithm adjusts model parameters to be determined, such as the entries of convolution matrices of a CNN, by means of the training data. The learning algorithm can, e.g., minimize a loss function by iteratively adjusting the model parameters via gradient descent and backpropagation. Further embodiments of the invention result when the described trained model for image segmentation is replaced by a classic image processing program which calculates the segmentation mask from an overview image without using a learned model. A segmentation mask can also exhibit imprecisions or errors in this scenario, which can be corrected by the described adjustment of a pattern.

A computer program according to the invention comprises commands that cause the execution of one of the described method variants when said method variants are executed by a computer. The computer program can in particular comprise commands by means of which it is possible to implement the processes described in relation to the computing device.

The method according to the invention can receive an overview image captured by a microscope or, generally speaking, by any other measuring device. In principle, the measuring device can be based on any measuring principle and additionally comprise a camera. In this sense, an overview image can be understood to be any image, with no delimitation vis-a-vis more detailed images with a higher magnification. The step of capturing the image can optionally form part of the method. Alternatively, the method draws on overview images already available or image data from a memory.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 2

Figure 2:
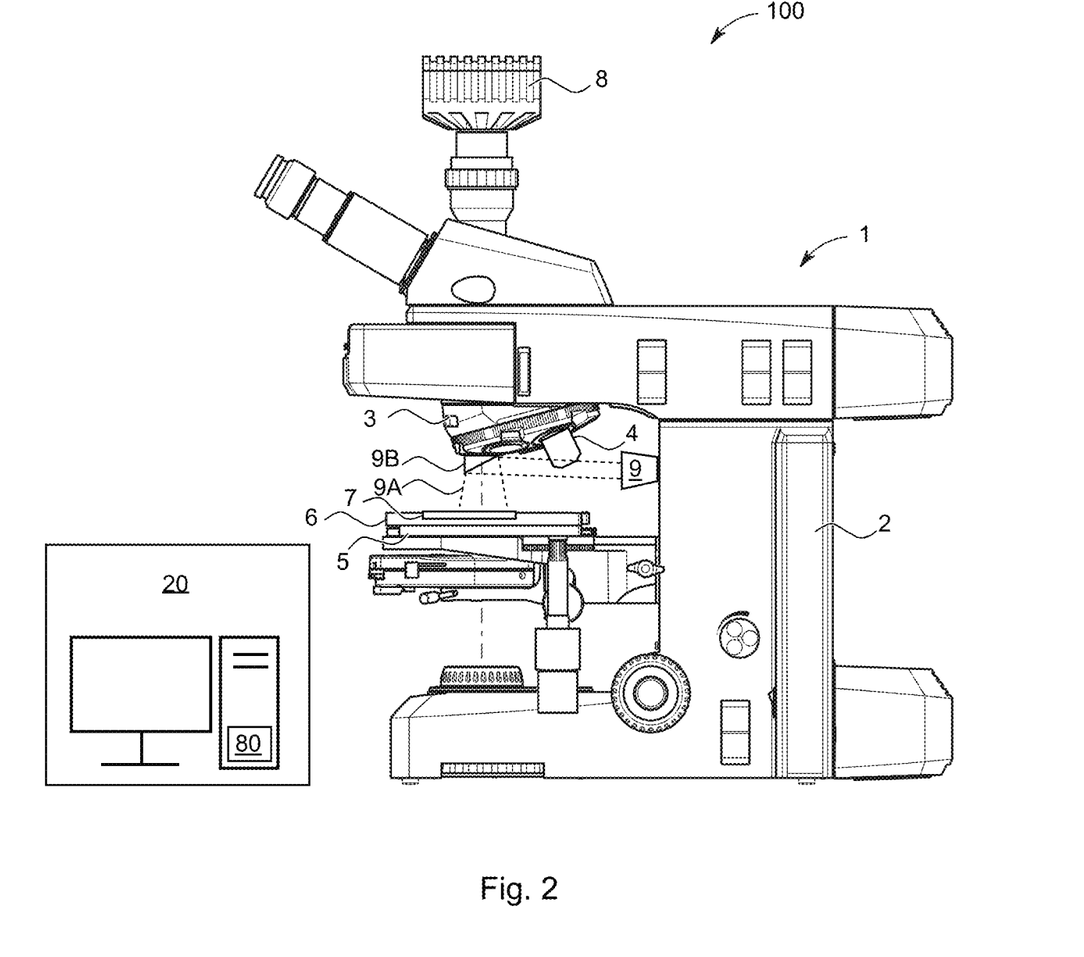
FIG. 2 is a schematic illustration of an example embodiment of a microscopy system of the invention.

FIG. 2 shows an example embodiment of a microscopy system 100 according to the invention. The microscopy system 100 comprises a computing device 20 and a microscope 1, which is a light microscope in the illustrated example, but which in principle can be any type of microscope. The microscope 1 comprises a stand 2 via which further microscope components are supported. The latter can in particular include: an objective changer/revolver 3, on which an objective 4 is mounted in the illustrated example; a sample stage 5 with a holding frame 6 for holding a sample carrier 7; and a microscope camera 8. If the objective 4 has been rotated so as to be located in the microscope light path, the microscope camera 8 receives detection light from one or more samples supported by the sample carrier 7 in order to capture a sample image. A sample can be any object, fluid or structure. The microscope 1 also comprises an overview camera 9 for capturing an overview image of a sample environment. The overview image can show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror or some other deflection element can also be arranged at a different site. Alternatively, the overview camera 9 can also be arranged so as to view the sample carrier 7 directly without a mirror 9B. For example, the overview camera 9 can be arranged on the objective revolver 3. In principle, it is also possible for the microscope camera 8 to function as an overview camera when a different objective, in particular a macro-objective, is selected via the objective revolver 3 for the capture of an overview image.

The overview image can correspond to captured raw data or be formed via a preliminary processing of the raw data. The computing device 20 comprises a computer program 80 for processing the overview image. As described in greater detail in the following, the computer program 80 calculates a segmentation mask using the overview image. The calculated segmentation mask can in turn be used for further image analysis and to control the sample stage 5, a focus drive or other microscope components.

The calculation of the segmentation mask is described in greater detail in the following with reference to the further figures.

FIG. 3

Figure 3:
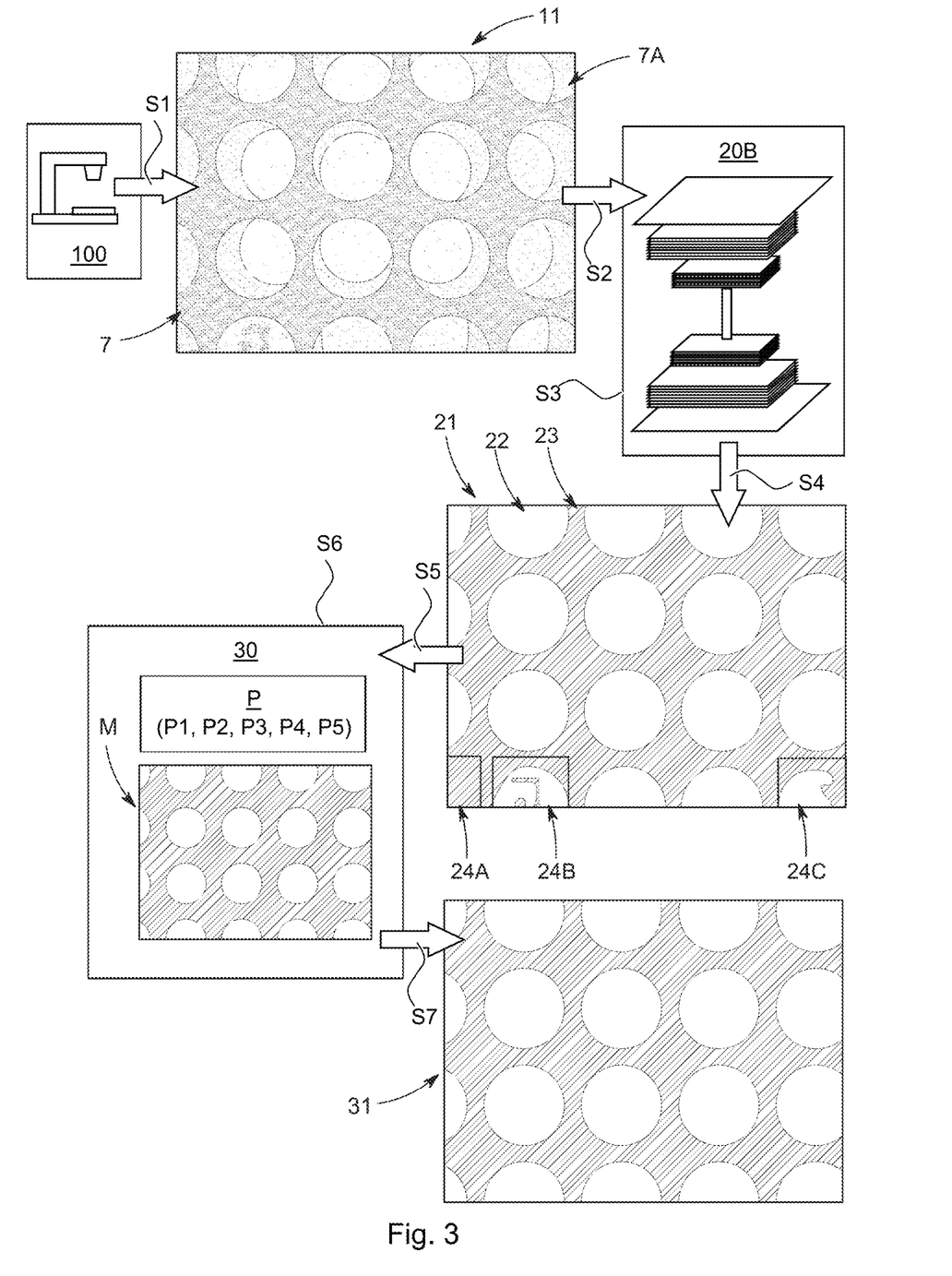
FIG. 3 is a schematic illustration of an example embodiment of a method of the invention.

FIG. 3 shows an example of a method process according to the invention. The steps described in the following can be executed in particular by the computer program 80 of the computing device 20.

An overview image 11 is first received from the overview camera of the microscopy system 100, step S1. The overview image 11 shows a sample carrier 7 with a plurality of sample receptacles 7A in a regular arrangement.

The overview image 11 is input into a segmentation model 20B, step S2. In step S3, the segmentation model 20B calculates a segmentation mask 21 in a basically known manner, which is output in step S4. The segmentation model 20B can be, for instance, a CNN the model parameter values of which were learned using training data. The segmentation mask 21 in this example is a binary mask with two possible pixel values. One pixel value labels image areas 22 depicting sample receptacles 7A while the other pixel value labels image areas 23 indicating that there is no sample receptacle 7A at the depicted location. In the illustrated example, the image areas 23 correspond to a surface of the sample carrier 7 outside the sample receptacles 7A. As shown in the framed problem areas 24A-24C, the segmentation of step S3 can generate erroneous areas. It is noted for the sake of clarity that the frames of the problem areas 24A-24C are not part of the segmentation mask 21. In the problem areas 24A-24C, image areas of sample receptacles are missing or the shapes of the sample receptacles have been detected incorrectly. These errors need to be corrected.

The segmentation mask 21 is thus entered into a program 30 for adjusting a pattern M, step S5. The program 30 can be part of the computer program 80. The pattern M is described by a parameterized model P comprising a plurality of parameters P1-P5, the values of which are defined by the program 30 so that the pattern M corresponds as closely as possible with the segmentation mask 21, step S6. For example, the parameters P1-P5 can define the size and spacing of circular shapes arranged in the form of a grid, which is described in greater detail with reference to the next figure. Once the values of the parameters P1-P5 have been determined, the pattern M formed with these values of the parameters P1-P5 can be output as the updated or new segmentation mask 31, step S7.

FIG. 4

Figure 4:
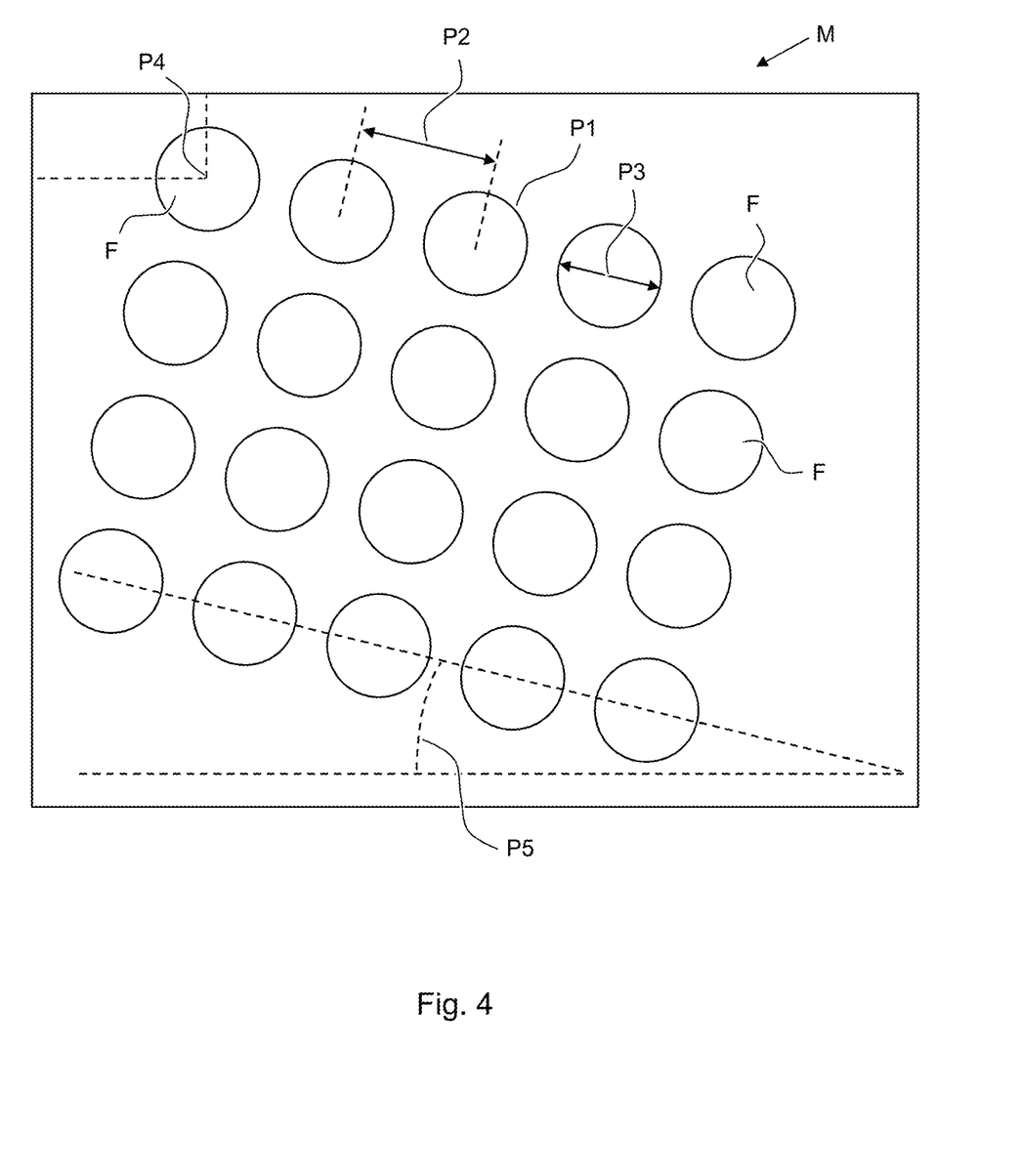
FIG. 4 shows schematically a regular pattern used to improve a segmentation mask in example embodiments of the invention.

FIG. 4 shows a pattern M, which is the representation of a parameterized model and which is to be adjusted to a segmentation mask. The parameterized model can specify, e.g., that certain shapes F are arranged in a regular matrix in the form of a grid, for example in rows and columns. The shape F can be predefined by the parameterized model, for example as a circle as illustrated, although square, rectangle or oval shapes are in principle also possible. Alternatively, the shape F can also be included in the parameterized model in the form of a parameter P1 so that the model is able to use a shape among different predefined shapes as a function of the chosen parameter P1. A further parameter P2 of the model determines a spacing between center points of adjacent shapes F. A parameter P3 indicates a size or a diameter of the shapes F. A parameter P4 indicates a position of the pattern M, for example through image coordinates of a center point of the top left shape F. A parameter P5 indicates a slope of a row of the shapes F.

Optionally, the parameterized model can also comprise further parameters or some of the described parameters P1-P5 can be replaced by other parameters in order to describe the pattern M. Possible further parameters can indicate in particular a number of shapes per row and/or per column. The design of the pattern M illustrated and described in the foregoing is not intended to be understood as exhaustive so that it is possible to add other shapes depending on the complexity of the model. For example, an additional rectangle can extend around all depicted shapes F and also be aligned in terms of its slope according to parameter P5. Such a rectangle or square can represent an outer edge of a sample carrier. Such further shapes can be provided in particular when a segmentation mask discriminates between more than two different categories, for example the three categories: sample receptacle/area, sample carrier and background.

Contextual data can also be derived from an overview image or a segmentation mask, which is taken into account in the choice of the parametric model or with regard to the parameters P1-P5. For example, a number of sample receptacles per row can be derived from the segmentation mask. This number is used for the shapes F per row. Optionally, a sample carrier type can be detected from the overview image or the segmentation mask, wherein a number of sample receptacles per row and column as well as a shape of the sample receptacles is stored for different sample carrier types.

Values of the parameters P1-P5 are adjusted so that a correspondence of the pattern M with the segmentation mask 21 of FIG. 3 is maximized. Correspondence can be defined, e.g., as the proportion of the shapes F corresponding with the areas 22 of the segmentation mask 21 in terms of surface area. The adjustment of the parameters P1-P5 can be calculated iteratively or analytically. The ready adjusted pattern M can then be used as the new segmentation mask, which is constituted by exact geometric shapes without defective areas. With reference to FIG. 3, in particular problem areas 24A-24C of the segmentation mask 21 are redressed by means of corrected content provided by the regularity of the pattern M. For example, a sample receptacle that was truncated in the original overview image 11 was not detected in the problem area 24A. The regularity of the pattern M, however, adds a shape F for the sample receptacle at the location in the image corresponding to the problem area 24A.

The pattern M shown in FIG. 4 is suitable for describing a microtiter plate with circular wells or more generally for describing an arrangement of circular objects in the form of a grid. In variations of this embodiment, a pattern can also be formed by other shapes, for example by squares for describing a chamber slide with square sample chambers. In further variants, the pattern can also describe one or more geometric objects without periodicity, for example a square, which can describe a segmentation of a cover slip on a slide.

The different embodiment variants of the invention allow the calculation of a segmentation mask free of defective areas and apt for further device control or image analysis.

The example embodiments are purely illustrative and variants of the same are possible within the scope of the attached claims.

LIST OF REFERENCE SIGNS

1 Microscope
2 Stand
3 Objective revolver
4 Microscope objective
5 Sample stage
6 Holding frame
7 Sample carrier
7A Sample receptacle of the sample carrier 7
8 Microscope camera
9 Overview camera
9A Field of view of the overview camera
9B Mirror
11 Overview image
20 Computing device
20A Segmentation model of the prior art
20B Segmentation model/model trained for image segmentation
21 Segmentation mask
22 Areas of the segmentation mask 20 that represent sample receptacles
23 Areas of the segmentation mask 20 that do not represent sample receptacles
24A-24C Problem areas of the segmentation mask 21
30 Program for adjusting the pattern M
31 Updated segmentation mask
80 Computer program
100 Microscopy system
100A Microscopy system according to the prior art
F Shapes of the pattern M
M Pattern
P Parameterized model
P1-P5 Parameters of the parameterized model
S1-S7 Steps of method variants of the invention

What is claimed is:

1. A microscopy system, comprising
a microscope configured to capture at least a first image; and
a computing device comprising a model trained for image segmentation, which is configured to calculate a segmentation mask based on at least the first image;
wherein the computing device is configured to generate an updated segmentation mask in which problem areas of the segmentation mask are removed by adjusting a mathematical pattern formed by a parameterized model to the segmentation mask and generating the updated segmentation mask using the adjusted mathematical pattern,
wherein the mathematical pattern includes a periodicity with repeating shapes,
wherein the problem areas in the segmentation mask are deviations from a periodic pattern with repeating shapes,
wherein the updated segmentation mask is free of problem areas,
wherein the first image or an image calculated therewith is analyzed in order to detect a sample carrier type,
wherein contextual data is stored for different sample carrier types, and
wherein the contextual data pertaining to the detected sample carrier type is used to adjust the mathematical pattern.

2. A method for image segmentation, comprising
receiving a first image;
calculating a segmentation mask based on the first image using a model trained for image segmentation;
generating an updated segmentation mask in which problem areas of the segmentation mask are removed by adjusting a mathematical pattern formed by a parameterized model to the segmentation mask, and generating the updated segmentation mask using the adjusted mathematical pattern,
wherein a plan-view image is first calculated from the first image using calibration data and the segmentation mask is calculated from the plan-view image; or
wherein the segmentation mask is calculated from the first image without first calculating a plan-view image with calibration data, and wherein the mathematical pattern described by the parameterized model is converted to a viewing angle of the first image using the calibration data before the adjusting of the mathematical pattern to the segmentation mask occurs.

3. The method according to claim 2,
wherein the mathematical pattern includes a periodicity with repeating shapes,
wherein the problem areas in the segmentation mask are deviations from a periodic pattern with repeating shapes, and
wherein the updated segmentation mask is free of problem areas.

4. The method according to claim 3,
wherein the mathematical pattern is periodic and
wherein the periodic pattern comprises an arrangement of similar shapes in the form of a grid.

5. The method according to claim 3,
wherein the periodic pattern describes sample receptacles of a sample carrier.

6. The method according to claim 2,
wherein parameters of the parameterized model which define the mathematical pattern are calculated such that the mathematical pattern has a highest possible degree of correspondence with the segmentation mask.

7. The method according to claim 6,
wherein calculation of the parameters includes an iterative adjustment in which the degree of correspondence between the mathematical pattern and the segmentation mask is maximized.

8. The method according to claim 2,
wherein parameters of the parameterized model indicate one or more of the following characteristics:
a uniform size of shapes of the mathematical pattern;
a uniform spacing between shapes of the mathematical pattern;
a slope of rows or columns of the shapes of the mathematical pattern;
a class type of the shapes of the mathematical pattern;
a position of the mathematical pattern relative to the segmentation mask.

9. The method according to claim 2,
wherein an image classification of the first image or an image calculated therewith is calculated;
wherein different mathematical patterns described by respective parameterized models are stored for different image classes;
wherein, depending on a result of the image classification, an associated stored mathematical pattern is selected and used for the adjusting to the segmentation mask.

10. The method according to claim 2,
wherein the first image or an image calculated therewith is analyzed in order to detect a sample carrier type;
wherein contextual data is stored for different sample carrier types;
wherein the contextual data pertaining to the detected sample carrier type is used to adjust the mathematical pattern.

11. The method according to claim 10,
wherein the contextual data relates to at least one of: parameter starting values and parameter border values for an iterative adjustment of the parameters.

12. The method according to claim 2,
wherein the adjusted mathematical pattern is used as the updated segmentation mask and output to a user or to a subsequent image processing program.

13. The method according to claim 12,
wherein the adjusted mathematical pattern used as the updated segmentation mask is a vector graphic.

14. The method according to claim 2,
wherein the problem areas in the segmentation mask are identified by comparing the adjusted mathematical pattern with the segmentation mask and are corrected using the adjusted mathematical pattern; and
wherein the thus corrected segmentation mask is used as the updated segmentation mask.

15. The method according to claim 2,
wherein the first image is an overview image.

16. A computer program with commands which are stored on a non-transitory computer-readable medium and which, when executed by a computer, cause the execution of the method according to claim 2.

17. The system of claim 1,
wherein parameters of the parameterized model which define the mathematical pattern are calculated such that the mathematical pattern has a highest possible degree of correspondence with the segmentation mask.

18. The system of claim 1,
wherein an image classification of the first image or an image calculated therewith is calculated;
wherein different mathematical patterns described by respective parameterized models are stored for different image classes;
wherein, depending on a result of the image classification, an associated stored mathematical pattern is selected and used for the adjusting to the segmentation mask.

19. The system of claim 1,
wherein the first image is an overview image.

20. A method for image segmentation, comprising:
receiving a first image;
calculating a segmentation mask based at least on the first image using a model trained for image segmentation;
generating an updated segmentation mask in which problem areas of the segmentation mask are removed by adjusting a mathematical pattern formed by a parameterized model to the segmentation mask, and generating the updated segmentation mask using the adjusted mathematical pattern;
wherein contextual data is stored for different sample carrier types; and
using the contextual data pertaining to a determined sample carrier type to adjust the mathematical pattern.

* * * * *